UNITED STATES PATENT OFFICE 2,615,860

SYNTHETIC RESINS STABILIZED WITH METAL CHELATE COMPOUNDS

Arthur Reginald Burgess, Harpenden, England, assignor to Imperial Chemical Industries Limited, a corporation of Great Britain No Drawing. Application June 3, 1950, Serial No. 166,077. In Great Britain June 9, 1949

7 Claims. (Cl. 260—45.75)

This invention relates to new synthetic resin compositions having improved stability.

A common defect of synthetic resins is that prolonged exposure to the weather, particularly to bright sunlight, causes deterioration in their mechanical and physical characteristics. This deterioration is largely due to oxidation and under certain circumstances constitutes a serious disadvantage. Thus, for example, electrical insulation consisting of synthetic resins is liable to embrittlement, increase of power factor and loss of electrical resistance if it is used in exposed locations. Another example is the colour instability of transparent synthetic resins on ageing in sunlight.

The object of the present invention is to provide synthetic resin compositions which have improved stability to light and particularly to ultra-violet light.

According to the present invention I provide a composition comprising a synthetic resin and not more than 10% by weight of said resin of a metal chelate compound having molecules containing the group

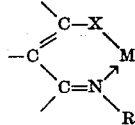

in which M represents a metal atom, X an oxygen or sulphur atom and R a hydrogen atom, a hydroxyl group or an alkyl or aryl radical, substituted if desired, and in which any remaining valencies of the metal M are satisfied covalently.

One particularly effective class of metal chelate compounds for use in the compositions of the present invention is that in which the molecules contain the group

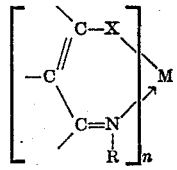

where M is a metal having a valency of at least two, $n$ is an integer from 2 to the valency of the metal, and where any valencies of the metal in excess of $n$ are satisfied covalently, for example, by oxygen or chlorine atoms or by a hydroxyl group.

Another particularly effective class of metal chelate compounds is that in which the molecules contain the group

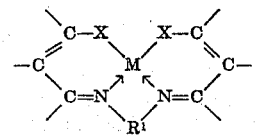

in which $R^1$ is a divalent aliphatic, cycloaliphatic or aromatic hydrocarbon or substituted hydrocarbon radical, and in which any valencies of the metal M in excess of two are satisfied covalently, for example by another chelating group or by oxygen or chlorine atoms or by a hydroxyl group.

Examples of particularly effective metals and radicals are $Ni^{++}$, $Cu^{++}$, $UO_2^{++}$, $Pb^{++}$, $Zn^{++}$ and $Co^{++}$, of which $Ni^{++}$ and $Cu^{++}$ are particularly preferred.

The carbon atoms contained in the chelating ring or rings of the molecules of the chelate compound may have their remaining valencies satisfied by hydrogen atoms or by alkyl or aryl groups, which groups may themselves be substituted, with, for example, one or more of the following groups: —Cl, —$OCH_3$, —CN, —OH, —$NR_2^2$ or $COOR^2$ where $R^2$ represents a hydrogen atom or an aryl or alkyl group. Alternatively, two adjacent carbon atoms in said ring or rings may constitute part of an aliphatic ring, or of an aryl ring which may itself be substituted, for example, with one or more of the suitable groups listed above, or may constitute part of a condensed (or fused) ring system with one or more further aryl rings.

These compounds may, in general, be prepared by mixing the appropriate chelating compound having an XH group in place of X, in the formula given hereinbefore, with a base of the metal in presence of dilute alkali. When X is oxygen, the chelating compounds may be prepared from Schiff's bases obtained by condensing 1:3 dialdehydes, 1:3 diketones, 1:3 ketoaldehydes or orthohydroxyaromatic aldehydes or ketones, such as, for example, acetyl acetone, benzoyl acetone, dibenzoyl methane, p-chlorobenzoyl benzoyl methane, methylmalonic dialdehyde, phenylmalonic dialdehyde, acetyl acetaldehyde and benzoyl acetaldehyde, with one molecular proportion of an aliphatic or aromatic primary amine or a half molecular proportion of an aliphatic or aromatic diamine. Schiff's bases derived from diamines may be used to prepare chelate compounds having molecules containing the preferred chelating group attached to the metal by four valencies. A typical example of a Schiff's base derived from a primary amine is salicylidene aniline. Examples of Schiff's bases derived from diamines are ethylenediamino bis(acetylacetone), ethylenediamino bis(2-hydroxybenzophenone), di-salicylidene ethylenediamine, and the corresponding hexamethylene diamine compounds. Preparation of the copper derivative of di-salicylidene ethylene diamine using copper sulphate as reactant may be represented by

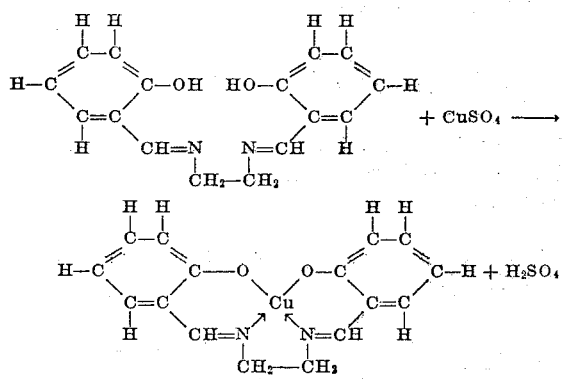

Suitable chelating compounds may also be prepared from oximes of ortho hydroxy aromatic ketones and aldehydes, such as salicylaldehyde oxime.

Chelate compounds in which X is sulphur may be prepared from materials similar in other respects to those used for the preparation of chelate compounds in which X is oxygen, but which have a sulphur atom replacing the appropriate oxygen atom. Thus, 2-mercapto-benzophenone may be condensed with primary amines or diamines to give suitable chelating compounds.

The most effective chelate compounds are those having a molecular extinction coefficient, E (as defined on page 4 of Brode's "Chemical Spectroscopy," published by John Wiley and Sons, 2d edition, 1943), with respect to light having a wavelength with the range of 2,950 to 3,300 angstrom units, such $\log_{10} E \geq 2.5$.

The chelate compounds used in the compositions of the present invention are effective with all synthetic resins and thus may be used with such diverse materials as cellulose acetate, polystyrene, polyvinyl chloride, linear superpolyamides and a solid polymer of ethylene. Synthetic resins of the thermoplastic type are in general more susceptible to light than are the thermosetting materials and are also more frequently used in applications where appearance and colour is important. Among thermoplastic synthetic resins, polymerised hydrocarbons such as a solid polymer of ethylene, linear superpolyamides wherein the amine groups are separated by a hydrocarbon chain (commonly known as nylon), and polyvinyl chloride are particularly liable to degradation by photochemical oxidation when exposed to sunlight, and are frequently used under conditions where such oxidation is liable to occur, e. g. as electrical insulation, films for wrapping and similar purposes, and, in the case of nylon, as fabrics. Consequently the present invention has particular significance in connection with the outdoor use of thermoplastic materials, and especially of polymerised hydrocarbons, linear superpolyamides and polyvinyl chloride.

The chelate compound is preferably used in a finely divided state, and may be mixed with the synthetic resin by any suitable method which will effect thorough distribution. The precise method employed will depend upon the particular synthetic resin to be compounded. One method is to carry out the mixing by milling the materials on heated rolls, such as are used in the compounding of rubber, or on other suitable milling or mixing equipment, such as a Banbury mixer. The chelate compound may also be added to a solution or suspension of the synthetic resin and the solvent or dispersing medium subsequently removed by vaporisation. Alternatively, the chelate compound may be incorporated with the synthetic resin at a convenient stage in the production of the latter.

Other ancillary ingredients such as fillers, extenders, plasticisers, lubricants, dyes, pigments, thermal antioxidants and the like may also be incorporated in the compositions of the present invention.

The chelate compounds have no serious effect upon the other physical and mechanical properties of the synthetic resins. Accordingly the compositions of the present invention may be converted into films, coatings and fibers or fabricated into shaped articles by conventional techniques.

The invention is illustrated but in no way limited by the following example, in which all parts given are by weight:

*Example*

100 parts of a solid polymer of ethylene having a viscosity at 190° C. of 400 poises and an average molecular weight of 12000 were milled at 150° C. for 10 minutes with 1 part of metal chelate compound. The mill used for this purpose was one of a type conventionally used for milling rubber. The resulting composition was shaped into a flat sheet having a thickness of about 20 mils by pressing in a steam press at 160° C. for 4 minutes between platens under a pressure of 70 tons per square inch.

A sample of the sheet was tested by exposing it, with a sample of a sheet of the same a solid polymer of ethylene prepared in the same way but containing no chelate compound, for one week at 25° C. to light from a tubular mercury vapour lamp. The lamp was placed at the centre of a double-walled silica vessel, and an aqueous solution of copper sulphate containing 75 gms. copper sulphate ($CuSO_4 5H_2O$) per litre was circulated through the wall of the vessel. The wall chamber had an internal diameter of 5 cms. and an external diameter of 8 cms. The samples to be tested were mounted on a rotating drum, 21 cms. in diameter, which was symmetrically placed round the vessel enclosing the lamp, and a stream of air was passed continuously through the space between the drum and the silica vessel. The wave length range of the light from the mercury vapour lamp was restricted, by passage through the copper sulphate solution, to values greater than 2950 angstrom units. This lower limit of 2950 angstrom units corresponds approximately to the shortest wave length present in radiation from the sun.

At the end of the week's exposure the ratio of the concentration of carbonyl groups in the treated and untreated samples was determined by measurement of the infra-red absorption at 1720 wave nos.

The concentration of carbonyl groups in the specimen gives a measure of the extent to which oxidation of the specimen has occurred. Also, since the power factor of polyethylene is directly proportional to the concentration of carbonyl groups, determination of the ratio described above provides a convenient method of comparing the efficiencies as stabilisers of different compounds. It will be appreciated, however, that this test is not an absolute measure of the efficiency of the stabiliser, since the apparent efficiency depends on the thickness of the sample tested. It is found that the stabilisers sensitise the surface layers while protecting the material in the centre of the sample against oxidation.

Various chelate compounds were tested in the manner described, and in two instances the chelate compound was used in 5% concentration and the samples exposed to the light for six weeks. The results obtained are indicated in the following table in which the fourth column shows the ratios of the carbonyl group concentrations in the exposed treated samples to that in an exposed untreated sample.

| Chelate compound employed | Percent Chelate compound present | Time of exposure | Carbonyl group ratio |
|---|---|---|---|
|  |  | Weeks |  |
| Nickel derivative of Schiff's base derived from ethylene diamine and salicylaldehyde | 1 | 1 | 0.22 |
|  | 5 | 6 | 0.05 |
| Copper derivative of Schiff's base derived from ethylene diamine and salicylaldehyde | 1 | 1 | 0.27 |
|  | 5 | 6 | 0.16 |
| Uranyl derivative of Schiff's base derived from ethylene diamine and salicylaldehyde | 1 | 1 | 0.50 |
| Zinc derivative of Schiff's base derived from ethylene diamine and salicylaldehyde | 1 | 1 | 1.06 |
| Cobalt derivative of Schiff's base derived from ethylene diamine and salicylaldehyde | 1 | 1 | 1.50 |
| Copper derivative of Schiff's base derived from methylamine and salicylaldehyde | 1 | 1 | 0.12 |
| Copper derivative of Schiff's base derived from o-phenylenediamine and salicylaldehyde | 1 | 1 | 0.32 |
| Uranyl derivative of Schiff's base derived from hexamethylene diamine and salicylaldehyde | 1 | 1 | 0.59 |

I claim:

1. A composition comprising a solid polymer of ethylene and not more than 10 per cent by weight of said solid polymer of a metal chelate compound, said metal chelate compound being the nickel derivative of the Schiff's base derived from ethylenediamine and salicylaldehyde.

2. A composition comprising a solid polymer of ethylene and not more than 10 per cent by weight of said solid polymer of a metal chelate compound, said metal chelate compound being the copper derivative of the Schiff's base derived from ethylenediamine and salicylaldehyde.

3. A composition comprising a solid polymer of ethylene and not more than 10 per cent by weight of said solid polymer of a metal chelate compound, said metal chelate compound being the uranyl derivative of the Schiff's base derived from ethylenediamine and salicylaldehyde.

4. A composition comprising a solid polymer of ethylene and not more than 10 per cent by weight of said solid polymer of a metal chelate compound, said compound being the copper derivative of the Schiff's base derived from methylamine and salicylaldehyde.

5. A composition comprising a solid polymer of ethylene and not more than 10%, by weight, of said solid polymer of a metal chelate compound, said compound being the uranyl derivative of the Schiff's base derived from hexamethylene diamine and salicylaldehyde.

6. A composition comprising a synthetic resin from the class consisting of polyvinyl chloride and a solid polymer of ethylene and not more than 10%, by weight, of said resin of a metal chelate compound having the formula:

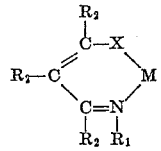

in which M represents a metal atom selected from the group consisting of nickel, copper, lead and uranium; X represents an atom from the group consisting of oxygen and sulphur; $R_1$ represents a radical from the group consisting of hydrogen, hydroxyl, alkyl and aryl; and $R_2$ represents a radical from the group consisting of hydrogen, alkyl and aryl.

7. A composition of matter comprising a solid polymer of ethylene and not more than 10%, by weight, of said polymer of a nickel chelate of a Schiff's base derived from an amine and salicylaldehyde.

ARTHUR REGINALD BURGESS.

REFERENCES CITED

The following references are of record in the file of this patent:

UNITED STATES PATENTS

| Number | Name | Date |
|---|---|---|
| 2,465,296 | Swiss | Mar. 22, 1949 |

OTHER REFERENCES

Ind. and Eng. Chem., June, 1945, page 526.